(12) United States Patent
Cha et al.

(10) Patent No.: US 11,570,302 B1
(45) Date of Patent: Jan. 31, 2023

(54) SYSTEM FOR PROVIDING CAPTION FEEDBACK SERVICE TO CALL CENTER AGENT DURING PHONE CALL BETWEEN CALL CENTER AGENT AND TRS USER

(71) Applicant: Mezmo Corporation, Buena Park, CA (US)

(72) Inventors: Wonjae Cha, Irvine, CA (US); Haesung Lee, Irvine, CA (US)

(73) Assignee: Mezmo Corporation, Buena Park, CA (US)

( * ) Notice: Subject to any disclaimer, the term of this patent is extended or adjusted under 35 U.S.C. 154(b) by 0 days.

(21) Appl. No.: 17/546,995

(22) Filed: Dec. 9, 2021

(51) Int. Cl.
*H04M 3/00* (2006.01)
*H04M 3/51* (2006.01)

(52) U.S. Cl.
CPC ..................... *H04M 3/51* (2013.01)

(58) Field of Classification Search
CPC ...... H04M 3/51; H04M 3/58; H04M 3/42391; G10L 15/22; G10L 15/30; G10L 15/26
See application file for complete search history.

(56) References Cited

U.S. PATENT DOCUMENTS

| | | | |
|---|---|---|---|
| 9,324,324 B2 | 4/2016 | Knighton | |
| 9,547,642 B2 | 1/2017 | Potkonjak | |
| 9,571,638 B1 | 2/2017 | Knighton et al. | |
| 10,044,854 B2 | 8/2018 | Rae et al. | |
| 2018/0270350 A1 | 9/2018 | Engelke et al. | |
| 2022/0284903 A1* | 9/2022 | Cha | G10L 15/22 |

* cited by examiner

*Primary Examiner* — Rasha S Al Aubaidi
(74) *Attorney, Agent, or Firm* — Heedong Chae; Lucem, PC

(57) ABSTRACT

A system for providing a caption feedback service to a call center agent includes a plurality of TRS providers, a caption feedback system, and a plurality of call centers. The TRS providers provide a transcription service to TRS users during phone calls between the TRS users and peers, and the call centers connect phone calls between customers and call agents. The caption feedback system is connected to the caption feedback agents of the TRS providers and caption feedback clients of the call centers via data networks. If the caption feedback system finds that the TRS user's phone number matches the customer's phone number and the peer's phone number matches the call center's phone number, the caption feedback server connects the TRS provider to the call center via data network to enable transfer of the caption data of the call agent's voice from the TRS provider to the call center.

20 Claims, 3 Drawing Sheets

SYSTEM FOR PROVIDING CAPTION FEEDBACK SERVICE TO CALL CENTER AGENT DURING PHONE CALL BETWEEN CALL CENTER AGENT AND TRS USER

FIELD OF THE INVENTION

The present invention relates to a system for providing a caption feedback service to a call center agent during a phone call between the call center agent and a TRS (Telecommunications Relay Service) user for accurate communication. In particular, the invention relates to a system for providing real-time transcription of the call center agent's voice to the call center agent by a TRS provider, which provides a transcription service to the TRS user for the phone call between the call center agent and the TRS user, so that the call center agent can review the transcription of his voice and make a correction if necessary.

BACKGROUND OF THE INVENTION

A telecommunications relay service, also known as TRS, is used to help a person who is deaf or hard of hearing make phone calls. A TRS provider allows a person who is deaf or hard of hearing (the TRS user) to have a phone call with another person (a peer) by receiving the peer's voice and its caption data transcribed by the TRS provider. Such transcription is usually made by a human call agent, automatic speech recognition, or both. The TRS provider includes a voice handler and a caption handler where the voice handler handles voice transfer between the TRS user, the peer, and the transcriber, and the caption handler handles transfer of the data caption transcribed from the peer's voice. The voice handler receives the peer's voice from the peer and sends it to the transcriber. In turn, the transcriber transcribes the peer's voice into the data caption which is sent to the TRS user by the caption handler.

A call center handles a large volume of phone calls with current or potential customers and includes call center agents or call agents to handle the phone calls. A call center usually utilizes a call switch or private branch exchange (PBX) to permit sharing of central office lines between internally installed telephones and provide intercommunication between these internal telephones used by the call agents. The central office lines are connected to the public switched telephone network (PSTN). The call center uses a call center software or call agent assistant program to allow the call agents to handle the phone calls.

When a TRS user communicates with a call agent of a call center over the phone, the peer for the service of the TRS provider is the call agent and the customer of the call center is the TRS user. The TRS provider transcribes the voice of the call agent and forwards the transcribed caption data to the customer of the call center. If there is an error or inaccuracy in the transcribed caption data, miscommunication may occur or the TRS user may obtain inaccurate or incomplete information from the mistranscribed caption data. The TRS user usually reads the transcribed caption data to understand and then replies. Thus, if there is an error or inaccuracy in the transcribed caption data, the phone call may be unnecessarily prolonged.

Accordingly, if the call agent can see the caption data transcribed from his voice, he can double-check whether there is an error or inaccuracy in the transcribed caption data and if there is, he can immediately correct it.

Therefore, to solve the above problems, a system for providing a caption feedback service to a call center agent during a phone call between the call center agent and a TRS user for accurate communication is provided, as there is a need for a system that provides the transcription of the call center agent's voice not just to the TRS user but also to the call center agent. This invention is directed to solve these problems and satisfy the long-felt need.

SUMMARY OF THE INVENTION

The present invention contrives to solve the disadvantages of the prior art. The present invention provides a system for providing a caption feedback service to a call center agent during a phone call between the call center agent and a TRS user for accurate communication.

One object of the invention is to provide a system for providing a caption feedback service to a call agent of a call center during a phone call between the call agent of the call center and a TRS user. The system includes a plurality of TRS providers, a caption feedback system, and a plurality of call centers.

The TRS providers provide a transcription service to TRS users during phone calls between the TRS users and peers, and each of the TRS providers includes a caption handler and a caption feedback agent. The phone call between the TRS user and the peer includes a first phone number associated with the TRS user and a second phone number associated with the peer. In other words, the first phone number is the TRS user's phone number to receive the transcription service from the TRS provider whereas the second number is the peer's phone number with whom the TRS user has a phone call using the transcription service.

The call centers connect phone calls between customers and call agents, and each of the call centers includes a call agent assistant program and a caption feedback client. The phone call between the customer and the call agent includes a first phone number associated with the customer and a second phone number associated with the call center. In other words, the first number is the customer's phone number and the second number is the call center's phone number.

The caption feedback system includes a caption feedback server which includes a database. The caption feedback server is connected to the caption feedback agents of the TRS providers via data networks, and the caption feedback server is also connected to the caption feedback clients of the call centers via data networks.

The caption feedback agent is configured to send a call information indication for the phone call between the TRS user and the peer to the caption feedback server and the caption feedback server is configured to save the call information indication in the database. The call information indication includes the first phone number associated with the TRS user and the second phone number associated with the peer. Furthermore, the caption feedback client is configured to send a call information request for the phone call between the customer and the call agent to the caption feedback server, and the call information request includes the first phone number associated with the customer. The call information request may further include the second phone number associated with the call center.

The caption feedback server is configured to compare the call information indication saved in the database with the first phone number associated with the customer and the second phone number associated with the call center. If the caption feedback server finds that the first phone number of the call information indication matches the first phone number of the call information request and the second phone number of the call information indication matches the second phone number associated with the call center, that means that the phone call is between the TRS user and the call agent, and thus, the caption feedback server connects the TRS provider to the call center via data network to enable transfer of a caption data from the TRS provider to the call center. The caption data comprises a transcription of the call center agent's voice. If he finds an error in the transcription, he may correct that by saying it again or clarifying it.

Another object of the invention is to provide a caption feedback system for providing a caption feedback service to a call agent of a call center during a phone call between the call agent and a TRS user. The system includes a caption feedback server which has a database. The caption feedback server is connected to a plurality of TRS providers via data networks and a plurality of call centers via data networks. The TRS providers provide a transcription service to the TRS users during the phone calls between the TRS user and peers, and the call centers connect phone calls between customers and call agents. If the TRS user's phone number matches the customer's phone number and the peer's phone number matches the call center's phone number, that means that the phone call is between the TRS user and the call agent, and thus, the caption feedback system connects the call center to the TRS provider via data network to enable transfer of the caption data of the call agent's voice from the TRS provider to the call agent for review.

Still another object of the invention is to provide a caption feedback system for providing a caption feedback service to a call agent of a call center during a phone call between the call agent and a TRS user. The system includes a caption feedback server which has a database. The caption feedback server is connected to a TRS provider via data network and a call center via data network. The TRS providers provide a transcription service to the TRS users during phone calls between the TRS user and peers, and the call centers connect phone calls between customers and call agents. If the TRS user's phone number matches the customer's phone number and the peer's phone number matches the call center's phone number, then the caption feedback system connects the call center to the TRS provider via data network to enable transfer of the caption data of the call agent's voice from the TRS provider to the call agent for review.

The advantages of the present invention are: (1) the system of the present invention provides caption data transcribed by the TRS provider from a call center agent's voice to the call center agent for accurate communication with the TRS user; (2) using the system of the present invention, the call center agent can review the transcription of his voice and immediately make a correction if there is any error in the transcription; (3) the system of the present invention can save time in a phone call between the call center agent and the TRS user and improve the quality of communication; (4) the system of the present invention can be easily and conveniently connected to any additional TRS providers simply by installing a caption feedback agent into the system of the TRS provider to provide the caption feedback service to more TRS users; (5) the system of the present invention can be easily and conveniently connected to any additional call centers simply by installing a caption feedback client into the call agent assistant program of the call center to provide the caption feedback service to more call centers; (6) the system of the present invention is easy to install into the existing systems of the TRS providers and call centers; (7) using the software applications or modules of the caption feedback agent and caption feedback client, the system of the present invention can easily expand its caption feedback service; and (8) the graphic user interface of the caption feedback client is easy to use by the call agents.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
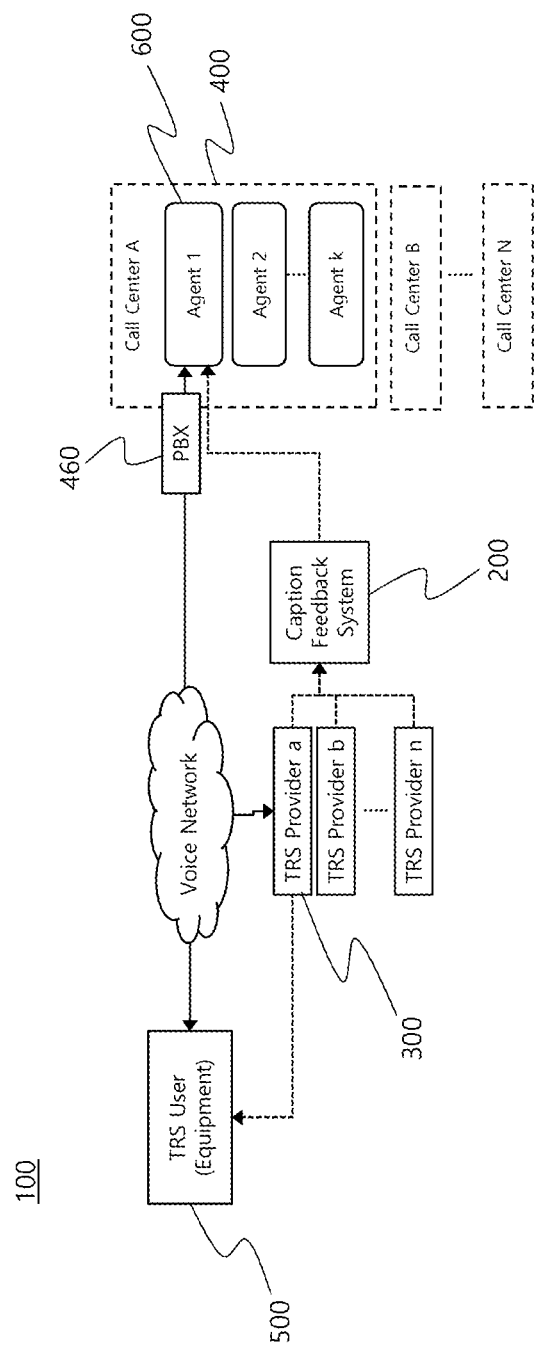
FIG. 1 is a schematic diagram of a system for providing a caption feedback service to a call center agent according to the present invention.
Figure 2:
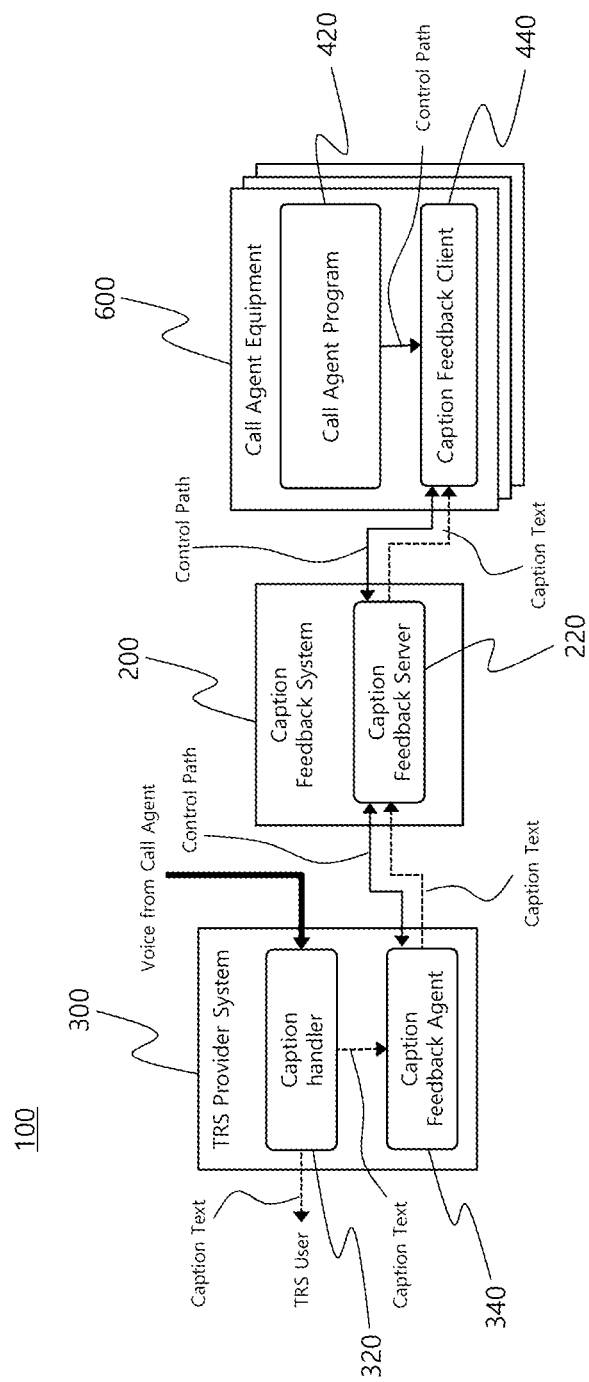
FIG. 2 is another schematic diagram of the system for providing the caption feedback service to the call center agent according to the present invention.
Figure 3:
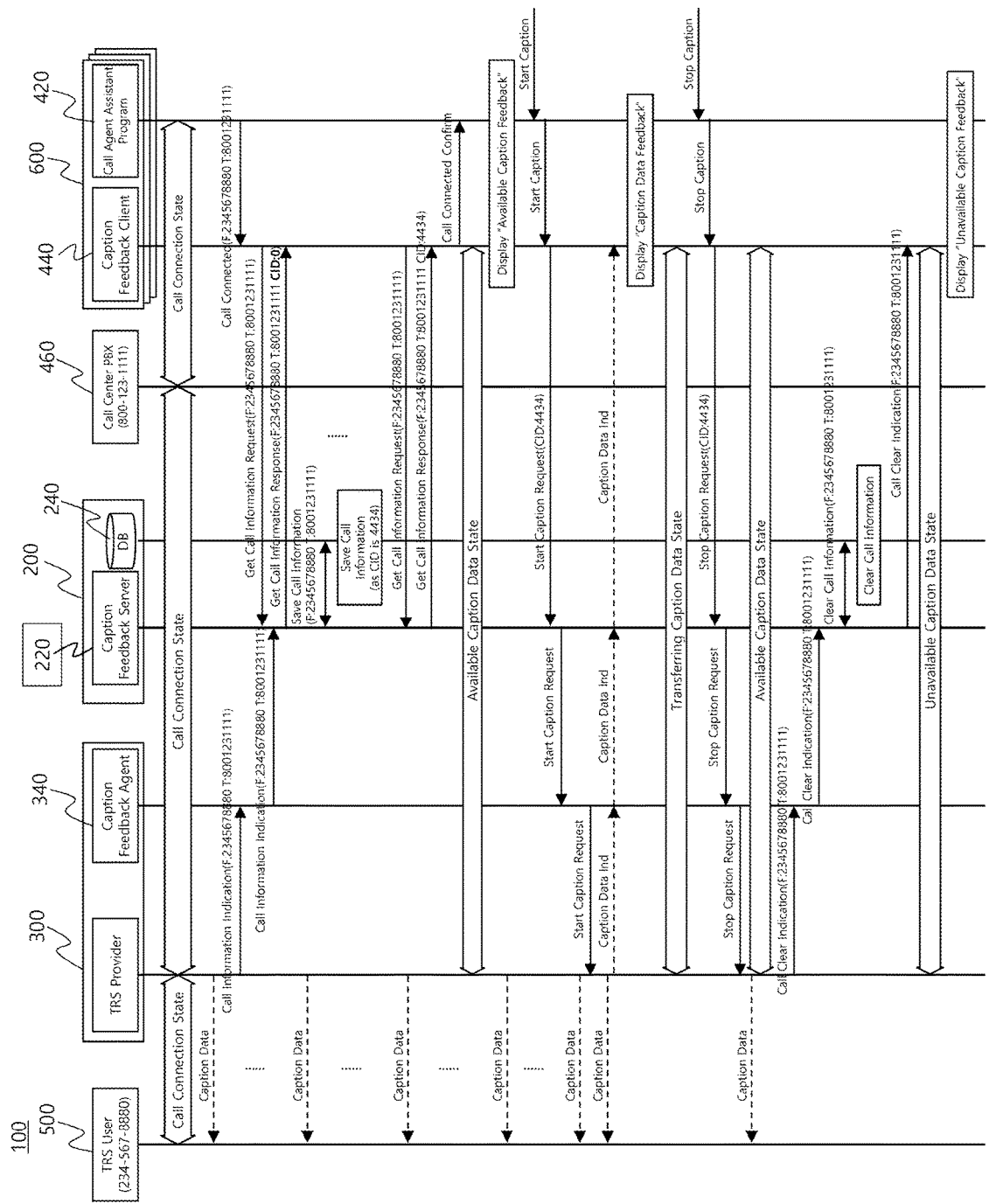
FIG. 3 is a schematic flowchart of the system for providing the caption feedback service to the call center agent according to the present invention.

FIGS. 1 and 2 show schematic diagrams of a system for providing a caption feedback service to a call center agent according to the present invention, and FIG. 3 shows a schematic flowchart of the system for providing the caption feedback service to the call center agent according to the present invention.

The system 100 of the present invention provides a caption feedback service to a call agent 600 of a call center 400 during a phone call between the call agent 600 of the call center 400 and a TRS user 500. The system 100 includes a plurality of TRS providers 300, a caption feedback system 200, and a plurality of call centers 400.

The TRS providers 300 provide a transcription service to TRS users 500 during phone calls between the TRS users 500 and peers, and each of the TRS providers 300 includes a caption feedback agent 340. The phone call between the TRS user 500 and the peer includes a first phone number associated with the TRS user 500 and a second phone number associated with the peer. In other words, the first phone number is the TRS user's phone number to receive the transcription service from the TRS provider 300 whereas the second number is the peer's phone number with whom the TRS user 500 has a phone call using the transcription service.

The call centers 400 connect phone calls between customers and call agents 600, and each of the call centers 400 includes a call agent assistant program 420 and a caption feedback client 440. As shown in FIGS. 2 and 3, the call center 400 includes a plurality of call agent equipment 600 to be used by the call agents 600, and the call agent assistant program 420 and the caption feedback client 440 are installed on the call agent equipment 600. The call agent assistant program 420 and caption feedback client 440 may be separate programs or the caption feedback client 440 may be incorporated into the call agent assistant program 420. The phone call between the customer and the call agent 600 includes a first phone number associated with the customer and a second phone number associated with the call center 400. In other words, the first number is the customer's phone number and the second number is the call center's phone number.

The caption feedback system 200 includes a caption feedback server 220 which includes a database 240. The caption feedback system 200 may be a system larger than the caption feedback server 220, or the caption feedback server 220 itself may be the caption feedback system 200. As shown in FIGS. 1 and 2, the caption feedback server 220 is connected to the caption feedback agents 340 of the TRS providers 300 via data networks. Additionally, the caption feedback server 220 is connected to the caption feedback clients 440 of the call centers 400 via data networks. More specifically, the caption feedback server 220 is connected to the caption feedback clients 440 installed on the call agent equipment 600.

As shown in FIG. 3, the caption feedback agent 340 is configured to send a call information indication for the phone call between the TRS user 500 and the peer to the caption feedback server 220 and the caption feedback server 220 is configured to save the call information indication in the database 240. The call information indication includes the first phone number associated with the TRS user 500 and the second phone number associated with the peer. The call information indication is generated and sent to the caption feedback server 200 to find out whether the peer is a call agent 600 of a certain call center 400.

The caption feedback client 440 is configured to send a call information request for the phone call between the customer and the call agent 600 to the caption feedback server 220, and the call information request includes the first phone number associated with the customer. The call information request is generated and sent to the caption feedback server 220 to find out whether the customer is a TRS user 500 of a certain TRS provider 300. The call information request may further include the second phone number associated with the call center. Alternatively, the second phone number associated with the call center 400 may be already saved in the caption feedback system 200 and retrieved by processing the call information request.

The caption feedback server 220 is configured to compare the call information indication saved in the database 240 with the first phone number associated with the customer and the second phone number associated with the call center 400. If the caption feedback server 220 finds that the first phone number of the call information indication matches the first phone number of the call information request and the second phone number of the call information indication matches the second phone number associated with the call center 400, then the caption feedback server 220 connects the TRS provider 300 to the call center 400 via data network to enable transfer of a caption data from the TRS provider 300 to the call center 400 where the caption data comprises a transcription of a voice of the call agent 600 of the call center 400.

If the first phone number of the call information indication matches the first phone number of the call information request and the second phone number of the call information indication matches the second phone number associated with the call center 400, that means that the first phone number associated with the TRS user 500 is the same as the first number associated with the customer and the second phone number associated with the peer is the same as the second phone number associated with the call center 400, and thus, the TRS user 500 is the customer and the peer is the call agent 600 of the call center 400. During the phone call between the TRS user 500 and the call agent 600, the TRS provider 300 provides the transcription of the call agent's voice to the TRS user 500, and such transcription can be made available to the call agent 600 as well for review and correction by connecting the TRS provider 300 and the call center 400 via data networks. If the phone call is between the TRS user 500 and the call agent 600, the caption feedback server 220 connects the TRS provider 300 to the call center 400 via data network to enable transfer of a caption data of the call agent's voice from the TRS provider 300 to the call center 400.

The call information request may further include the second phone number associated with the call center 400. Alternatively, the second phone number associated with the call center 400 may be stored in the caption feedback server 220 and the caption feedback server 220 may retrieve the second phone number associated with the call center 400 upon receiving the call information request.

Once the PBX of the call center 400 establishes a phone call between the customer and the call agent 600, the call agent assistant program 420 generates a call connected message for the phone call between the customer and the call agent 600 and transfers the call connected message to the caption feedback client 440. The call connected message includes the first phone number associated with the customer and may further include the second phone number associated with the call center 400.

As shown in FIG. 3, if a phone call is established between the TRS user 500 and the call agent 600 using the transcription service of the TRS provider 300, the state of the system 100 becomes a call connection state between the TRS user 500 and the TRS provider 300, between the TRS provider 300 and the call center PBX 460, and between the call center PBX 460 and the call agent assistant program 420. Then, the TRS provider 300 sends the call information indication to the caption feedback server 220 and the caption feedback client 440 sends the call information request to the caption feedback server 220. If the call information indication is received later than the call information request, the phone call between the TRS user 500 and the call agent 600 is not recognized or confirmed by the caption feedback server 220. Accordingly, to prevent this situation, the call information request needs to be sent multiple times, periodically, or upon the call agent's request. In case that there is extended delay in receiving the call information indication, the caption feedback client 440 may be configured to periodically send the call information request to the caption feedback server 220 at a predetermined time interval during the phone call between the customer and the call agent 600.

Even after the caption feedback client 440 is connected to the TRS provider 300 via data networks for receiving caption data of the call agent's voice, the TRS user 500 may change the transcriber to another transcriber or the TRS provider 300 to another TRS provider during the phone call with the call agent 600. Or, the call agent 600 may transfer the phone call to another call agent 600. In these cases, the caption feedback client 440 and the TRS provider 300 may need to be connected again, and thus, the system 100 may have the function that the call information request can be sent upon request from the call agent 600.

The TRS provider 300 includes a voice handler and a caption handler 320. The voice handler handles voice transfer between the TRS user 500, the peer, and the transcriber, and the caption handler 320 handles transfer of the caption data transcribed from the peer's voice. The voice handler 320 receives the peer's voice from the peer and sends it to the transcriber. In turn, the transcriber transcribes the peer's voice into the caption data which is sent to the TRS user 500 by the caption handler 320. The caption feedback agent 340 is a software application or module installed into the pre-existing TRS provider system 300 and interacts with the caption handler 320 to receive the caption data when necessary.

If the caption feedback server 220 connects the TRS provider 300 to the call center 400 via data network to enable transfer of the caption data from the TRS provider 300 to the call center 400, the state of the system 100 becomes an available caption data state and the caption feedback client 440 is configured to send a start caption request to the caption feedback server 220 so that the caption feedback server 220 forwards the start caption request to the TRS provider 300 in order for the caption handler 320 to begin transfer of the caption data to the caption feedback agent 340, to the caption feedback server 220, and then to the caption feedback client 440. Preferably, the start caption request sent by the caption feedback client 440 includes the connection identification. The caption feedback client 440 includes a graphic user interface for displaying the caption data received from the caption handler 340. Furthermore, the caption feedback client 440 is configured to send a stop caption request to the caption feedback server 220 to stop transfer of the caption data. The caption feedback server 200 forwards the stop caption request to the TRS provider 300. Preferably, the stop caption request sent by the caption feedback client 440 includes the connection identification.

When the caption feedback server 220 saves the call information indication in the database 240, the caption feedback server 220 assigns a connection identification to the call information indication and saves the connection identification in the database 240 together with the call information indication. In response to the call information request received from the caption feedback client 440, the caption feedback server 220 sends a call information response to the caption feedback client 440. The call information response includes the connection identification assigned to the call information indication if the first phone number of the call information indication saved in the database 240 matches the first phone number of the call information request and the second phone number of the call information indication saved in the database 240 matches the second phone number associated with the call center 400. In contrast, the call information response includes the connection identification of a default value if the first phone number of the call information indication saved in the database 240 does not match the first phone number of the call information request or the second phone number of the call information indication saved in the database does not match the second phone number associated with the call center 400. The connection identification assigned to the call information indication is different from the default value, and preferably, the default value is "0". In other words, the caption feedback server 220 returns the connection identification of "0" to the caption feedback client 440 if the TRS user's phone number is different from the customer's phone number or the peer's phone number is different from the call center's phone number. The caption feedback server returns the connection identification which is not "0" if the TRS user's phone number is the same as the customer's phone number and the peer's phone number is the same as the call center's phone number.

The caption feedback client 440 includes a graphic user interface which displays an available caption feedback state or "available caption feedback" button if the connection identification of the call information response is not the default value. If the call agent 600 presses the "available caption feedback" button or the like, the caption feedback client 440 sends a start caption request to the caption feedback server 220 and the caption feedback server 220 forwards the start caption request to the TRS provider 300 so that the caption handler 320 begins transfer of the caption data to the caption feedback agent 340, to the caption feedback server 220, and then to the caption feedback client 440. The graphic user interface displays the caption data for the call agent's review.

As shown in FIG. 3, when the phone call between the TRS user 500 and the call agent 600 is terminated, the caption feedback server 220 is configured to: receive a call clear indication from the caption feedback agent 340 of the TRS provider 300; delete the call information indication for the phone call between the TRS user 500 and the call agent 600 saved in the database 240; send the call clear indication to the caption feedback client 440 of the call center 400; and disconnect between the TRS provider 300 and the caption feedback client 440. If the caption feedback server 220 receives the call clear indication, then the caption feedback server 220 is configured to disconnect between the TRS provider 300 and the caption feedback client 440. Here, "delete the call information indication" means not just removing the call information indication from the database 240 but also making the call information indication saved in the database 240 not available for comparison with the customer's phone number and the call center's phone number. Alternatively, when the phone call between the TRS user 500 and the call agent 600 is terminated, the caption feedback server 220 may receive the call clear indication from the caption feedback client 440 and disconnect between the TRS provider 300 and the caption feedback client 440.

FIG. 3 shows the schematic flowchart of the system 100 of the present invention for providing the caption feedback service to the call center agent 600. If the TRS user 500 makes a phone call to the call center 400 using the transcription service of the TRS provider 300, the TRS user 500 is connected to the TRS provider 300 and the TRS provider 300 is connected to the call center PBX 460. A call agent 600 is assigned for the phone call with the TRS user 500 by the call center PBX 460 and the call center PBX is connected to the call agent assistant program 420 of the call agent equipment 600 which is used by the call agent 600. Then, the state of the system 100 becomes a call connection state. Alternatively, the call agent 600 may initiate the phone call with the TRS user 500 and the TRS user 500 may re-route the phone call to use the transcription service of the TRS provider 300. Once the phone call is established through the TRS provider 300, the TRS provider 300 begins to transcribe the call agent's voice and sends the caption data of the call agent's voice to the TRS user 500.

Once a phone call is established between the TRS user 500 and the call agent 600, the TRS provider sends the call information indication to the caption feedback agent 340 and the caption feedback agent 340 forwards it to the caption feedback server 220. In addition, the call agent assistant program 420 generates a call connected message for the phone call between the TRS user 500 and the call agent 600 and transfers it to the caption feedback client 440 which is installed on the call agent equipment 600 to be used by the call agent 600. Then, the caption feedback client 440 generates and sends the call information request to the caption feedback server 220. If the database 240 does not have a data matching the call information request, the caption feedback server 220 returns a call information response back to the caption feedback client 440 where the call information response contains the connection identification of "0".

Once the caption feedback server 220 receives the call information indication, it assigns a connection identification, which is not "0", to the call information indication. Then, the connection identification is saved in the database 240 together with the call information indication. The caption feedback client 440 is configured to send the call information request periodically, multiple times, or upon the call agent's request. If the database 240 has a data matching the call information request, the caption feedback server 220 returns a call information response back to the caption feedback client 440 where the call information response contains the connection identification which is not "0". Then, the caption feedback server 220 connects the caption feedback client 440 to the TRS provider 300. The state of the system 100 becomes an available caption data state, and the graphic user interface for the call agent 600 displays an "available caption feedback".

If the call agent 600 presses the "start caption" button, the call agent assistant program 420 sends the "start caption" message to the caption feedback client 440 and the caption feedback client 440 sends the start caption request having the connection identification to the caption feedback server 220. The caption feedback server 220 forwards the start caption request to the caption feedback agent 340 which in turn forwards it to the TRS provider 300. Then, the TRS provider 300 begins to send the caption data to the caption feedback client 440 through the caption feedback server 220.

If the call agent 600 presses the "stop caption" button, the call agent assistant program 420 sends the "stop caption" message to the caption feedback client 440 and the caption feedback client 440 sends the stop caption request having the connection identification to the caption feedback server 220. The caption feedback server 220 forwards the stop caption request to the caption feedback agent 340 which in turn forwards it to the TRS provider 300. Then, the TRS provider 300 stops to send the caption data to the caption feedback client 440.

Once the phone call between the TRS user 500 and the call agent 600 is terminated, either the TRS provider 300 or the call center 400 sends the call clear indication to the caption feedback server 220 respectively through the caption feedback agent 340 or the caption feedback client 440. If the caption feedback server 220 receives the call clear indication, it disconnects between the TRS provider 300 and the call center 400 and deletes the call information indication from the database 240, and the state of the system 100 becomes an unavailable caption data state.

In the alternative embodiment, the present invention includes a caption feedback system 200 for providing a caption feedback service to a call agent 600 of a call center 400 during a phone call between the call agent 600 of the call center 400 and a TRS user 500. The system 200 includes a caption feedback server 220 which includes a database 240. The caption feedback server 220 is connected to a plurality of TRS providers 300 via data networks and a plurality of call centers 400 via data networks. The TRS providers 300 provide a transcription service to the TRS users 500 during phone calls between the TRS user 500 and peers, and the call centers 400 connect phone calls between customers and call agents 600.

The caption feedback server 220 is configured to receive a call information indication for the phone call between the TRS user 500 and the peer from the TRS provider 300 and save the call information indication in the database 240. The call information indication includes a first phone number associated with the TRS user 500 and a second phone number associated with the peer. Furthermore, the caption feedback server 220 is configured to receive a call information request for the phone call between the customer and the call agent 600 of the call center 400 from the call center 400. The call information request includes a first phone number associated with the customer and may additionally include a second phone number associated with the call center 400.

The caption feedback server 220 is configured to compare the call information indication saved in the database 240 with the first phone number associated with the customer and a second phone number associated with the call center 400. If the caption feedback server 220 finds that the first phone number of the call information indication saved in the database 240 matches the first phone number of the call information request and the second phone number of the call information indication saved in the database 240 matches the second phone number associated with the call center 400, then the caption feedback server 220 connects the TRS provider 300 to the call center 400 via data network to enable transfer of a caption data from the TRS provider 300 to the call center 400 where the caption data is a transcription of the call agent's voice.

When the caption feedback server 220 saves the call information indication in the database 240, the caption feedback server 220 assigns a connection identification to the call information indication and saves the connection identification in the database 240 together with the call information indication.

The caption feedback server 220 is configured to send a call information response to the call center 400 in response to the call information request. The call information response includes the connection identification assigned to the call information indication if the first phone number of the call information indication saved in the database 240 matches the first phone number of the call information request and the second phone number of the call information indication saved in the database 240 matches the second phone number associated with the call center 400. In contrast, the call information response includes the connection identification of a default value if the first phone number of the call information indication saved in the database 240 does not match the first phone number of the call information request or the second phone number of the call information indication saved in the database 240 does not match the second phone number associated with the call center 400. Here, the connection identification assigned to the call information indication is different from the default value, and the default value is preferably "0".

When the phone call between the TRS user 500 and the call agent 600 is terminated, the caption feedback server 220 is configured to: receive a call clear indication from the TRS provider 300; delete the call information indication for the phone call between the TRS user 500 and the call agent 600 saved in the database 240; send the call clear indication to the call center 240; and disconnect between the TRS provider 300 and the call center 400 if the caption feedback server 220 receives the call clear indication.

In still another embodiment, the present invention includes a caption feedback system 200 for providing a caption feedback service to a call agent 600 of a call center 400 during a phone call between the call agent 600 of the call center 400 and a TRS user 500. The system 200 includes a caption feedback server 220 having a database 240. The caption feedback server 220 is connected to a TRS provider 300 via data network and a call center 400 via data network. The TRS provider 300 provides a transcription service to the TRS user 500 during a phone call between the TRS user 500 and a peer, and the call center 400 connects a phone call between a customer and the call agent 600.

The caption feedback server 220 is configured to receive a call information indication for the phone call between the TRS user 500 and the peer from the TRS provider 300 and save the call information indication in the database 240. The call information indication includes a first phone number associated with the TRS user 500 and a second phone number associated with the peer. In addition, the caption feedback server 220 is configured to receive a call information request for the phone call between the customer and the call agent 600 from the call center 400. The call information request includes a first phone number associated with the customer and may further include a second phone number associated with the call center 400.

The caption feedback server 220 is configured to compare the call information indication saved in the database 240 with the first phone number associated with the customer and a second phone number associated with the call center 400. If the caption feedback server 220 finds that the first phone number of the call information indication saved in the database 240 matches the first phone number of the call information request and the second phone number of the call information indication saved in the database 240 matches the second phone number associated with the call center 400, then the caption feedback server 220 connects the TRS provider 300 to the call center 400 via data network to enable transfer of a caption data of the call agent's voice from the TRS provider 300 to the call center 400.

When the caption feedback server 220 saves the call information indication in the database 240, the caption feedback server 220 assigns a connection identification to the call information indication and saves the connection identification in the database 240 together with the call information indication. The caption feedback server 220 is configured to send a call information response to the call center 400 in response to the call information request.

The call information response includes the connection identification assigned to the call information indication if the first phone number of the call information indication saved in the database 240 matches the first phone number of the call information request and the second phone number of the call information indication saved in the database 240 matches the second phone number associated with the call center 400. In contrast, the call information response includes the connection identification of a default value if the first phone number of the call information indication saved in the database 240 does not match the first phone number of the call information request or the second phone number of the call information indication saved in the database 240 does not match the second phone number associated with the call center 400. The connection identification assigned to the call information indication is different from the default value, and the default value is preferably "0".

When the phone call between the TRS user 500 and the call agent 600 is terminated, the caption feedback server 220 is configured to: receive a call clear indication from the TRS provider 300; delete the call information indication for the phone call between the TRS user 500 and the call agent 600 saved in the database 240; send the call clear indication to the call center 400; and disconnect between the TRS provider 300 and the call center 400 if the caption feedback server 220 receives the call clear indication.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A system for providing a caption feedback service to a call agent of a call center during a phone call between the call agent of the call center and a TRS (Telecommunications Relay Service) user, the system comprising:
   a plurality of TRS providers for providing a transcription service to TRS users during phone calls between the TRS users and peers, wherein each of the TRS providers includes a caption feedback agent, wherein the phone call between the TRS user and the peer includes a first phone number associated with the TRS user and a second phone number associated with the peer;
   a caption feedback system which includes a caption feedback server wherein the caption feedback server includes a database; and
   a plurality of call centers for connecting phone calls between customers and call agents, wherein each of the call centers includes a call agent assistant program and a caption feedback client, wherein the phone call between the customer and the call agent includes a first phone number associated with the customer and a second phone number associated with the call center,
   wherein the caption feedback server is connected to the caption feedback agents of the TRS providers via data networks,
   wherein the caption feedback server is connected to the caption feedback clients of the call centers via data networks,
   wherein the caption feedback agent is configured to send a call information indication for the phone call between the TRS user and the peer to the caption feedback server and the caption feedback server is configured to save the call information indication in the database, wherein the call information indication includes the first phone number associated with the TRS user and the second phone number associated with the peer,
   wherein the caption feedback client is configured to send a call information request for the phone call between the customer and the call agent to the caption feedback server, wherein the call information request includes the first phone number associated with the customer,
   wherein the caption feedback server is configured to compare the call information indication saved in the database with the first phone number associated with the customer and the second phone number associated with the call center,
   wherein if the caption feedback server finds that the first phone number of the call information indication matches the first phone number of the call information request and the second phone number of the call information indication matches the second phone number associated with the call center, then the caption feedback server connects the TRS provider to the call center via data network to enable transfer of a caption data from the TRS provider to the call center wherein the caption data comprises a transcription of a voice of the call agent of the call center.

2. The system of claim 1, wherein the call information request includes the second phone number associated with the call center.

3. The system of claim 1, wherein for the phone call between the customer and the call agent, the call agent assistant program generates a call connected message for the phone call between the customer and the call agent and transfers the call connected message to the caption feedback client, wherein the call connected message includes the first phone number associated with the customer.

4. The system of claim 3, wherein the call connected message includes the second phone number associated with the call center.

5. The system of claim 1, wherein the caption feedback client is configured to periodically send the call information request to the caption feedback server at a predetermined time interval during the phone call between the customer and the call agent.

6. The system of claim 1, wherein the caption feedback client is configured to send the call information request to the caption feedback server upon request from the call agent.

7. The system of claim 1, wherein the TRS provider further includes a caption handler,
wherein if the caption feedback server connects the TRS provider to the call center via data network to enable transfer of the caption data from the TRS provider to the call center, the caption feedback client is configured to send a start caption request to the caption feedback server so that the caption feedback server forwards the start caption request to the TRS provider in order for the caption handler to begin transfer of the caption data to the caption feedback agent, to the caption feedback server, and then to the caption feedback client.

8. The system of claim 7, wherein the caption feedback client includes a graphic user interface for displaying the caption data received from the caption handler.

9. The system of claim 8, wherein the caption feedback client is configured to send a stop caption request to the caption feedback server to stop transfer of the caption data.

10. The system of claim 1, wherein when the caption feedback server saves the call information indication in the database, the caption feedback server assigns a connection identification to the call information indication and saves the connection identification in the database, and
wherein the caption feedback server is configured to send a call information response to the caption feedback client in response to the call information request,
wherein the call information response includes the connection identification assigned to the call information indication if the first phone number of the call information indication saved in the database matches the first phone number of the call information request and the second phone number of the call information indication saved in the database matches the second phone number associated with the call center.

11. The system of claim 10, wherein the call information response includes the connection identification of a default value if the first phone number of the call information indication saved in the database does not match the first phone number of the call information request or the second phone number of the call information indication saved in the database does not match the second phone number associated with the call center, and
wherein the connection identification assigned to the call information indication is different from the default value.

12. The system of claim 11, wherein the caption feedback client includes a graphic user interface which displays an available caption feedback state if the connection identification of the call information response is not the default value.

13. The system of claim 1, wherein, when the phone call between the TRS user and the call agent is terminated, the caption feedback server is configured to:
receive a call clear indication from the caption feedback agent of the TRS provider;
delete the call information indication for the phone call between the TRS user and the call agent saved in the database; and
send the call clear indication to the caption feedback client of the call center.

14. The system of claim 13, wherein the caption feedback server is further configured to disconnect between the TRS provider and the caption feedback client if the caption feedback server receives the call clear indication.

15. A caption feedback system for providing a caption feedback service to a call agent of a call center during a phone call between the call agent of the call center and a TRS (Telecommunications Relay Service) user, the system comprising:
a caption feedback server which includes a database, wherein the caption feedback server is connected to a plurality of TRS providers via data networks, wherein the TRS providers provide a transcription service to the TRS users during phone calls between the TRS user and peers, wherein the caption feedback server is connected to a plurality of call centers via data networks wherein the call centers connect phone calls between customers and call agents, wherein the caption feedback server is configured to receive a call information indication for the phone call between the TRS user and the peer from the TRS provider and save the call information indication in the database, wherein the call information indication includes a first phone number associated with the TRS user and a second phone number associated with the peer, wherein the caption feedback server is configured to receive a call information request for the phone call between the customer and the call agent of the call center from the call center, wherein the call information request includes a first phone number associated with the customer, wherein the caption feedback server is configured to compare the call information indication saved in the database with the first phone number associated with the customer and a second phone number associated with the call center, wherein if the caption feedback server finds that the first phone number of the call information indication saved in the database matches the first phone number of the call information request and the second phone number of the call information indication saved in the database matches the second phone number associated with the call center, then the caption feedback server connects the TRS provider to the call center via data network to enable transfer of a caption data from the TRS provider to the call center wherein the caption data comprises a transcription of a voice of the call agent of the call center.

16. The system of claim 15, wherein when the caption feedback server saves the call information indication in the database, the caption feedback server assigns a connection identification to the call information indication and saves the connection identification in the database, and
- wherein the caption feedback server is configured to send a call information response to the call center in response to the call information request,
- wherein the call information response includes the connection identification assigned to the call information indication if the first phone number of the call information indication saved in the database matches the first phone number of the call information request and the second phone number of the call information indication saved in the database matches the second phone number associated with the call center,
- wherein the call information response includes the connection identification of a default value if the first phone number of the call information indication saved in the database does not match the first phone number of the call information request or the second phone number of the call information indication saved in the database does not match the second phone number associated with the call center, and
- wherein the connection identification assigned to the call information indication is different from the default value.

17. The system of claim 15, wherein, when the phone call between the TRS user and the call agent is terminated, the caption feedback server is configured to:
- receive a call clear indication from the TRS provider;
- delete the call information indication for the phone call between the TRS user and the call agent saved in the database;
- send the call clear indication to the call center; and
- disconnect between the TRS provider and the call center if the caption feedback server receives the call clear indication.

18. A caption feedback system for providing a caption feedback service to a call agent of a call center during a phone call between the call agent of the call center and a TRS (Telecommunications Relay Service) user, the system comprising:
- a caption feedback server which includes a database, wherein the caption feedback server is connected to a TRS provider via data network wherein the TRS provider provides a transcription service to the TRS user during a phone call between the TRS user and a peer, wherein the caption feedback server is connected to a call center via data network wherein the call center connects a phone call between a customer and the call agent, wherein the caption feedback server is configured to receive a call information indication for the phone call between the TRS user and the peer from the TRS provider and save the call information indication in the database, wherein the call information indication includes a first phone number associated with the TRS user and a second phone number associated with the peer, wherein the caption feedback server is configured to receive a call information request for the phone call between the customer and the call agent from the call center, wherein the call information request includes a first phone number associated with the customer, wherein the caption feedback server is configured to compare the call information indication saved in the database with the first phone number associated with the customer and a second phone number associated with the call center, wherein if the caption feedback server finds that the first phone number of the call information indication saved in the database matches the first phone number of the call information request and the second phone number of the call information indication saved in the database matches the second phone number associated with the call center, then the caption feedback server connects the TRS provider to the call center via data network to enable transfer of a caption data from the TRS provider to the call center wherein the caption data comprises a transcription of a voice of the call agent of the call center.

19. The system of claim 18, wherein when the caption feedback server saves the call information indication in the database, the caption feedback server assigns a connection identification to the call information indication and saves the connection identification in the database, and
- wherein the caption feedback server is configured to send a call information response to the call center in response to the call information request,
- wherein the call information response includes the connection identification assigned to the call information indication if the first phone number of the call information indication saved in the database matches the first phone number of the call information request and the second phone number of the call information indication saved in the database matches the second phone number associated with the call center,
- wherein the call information response includes the connection identification of a default value if the first phone number of the call information indication saved in the database does not match the first phone number of the call information request or the second phone number of the call information indication saved in the database does not match the second phone number associated with the call center, and
- wherein the connection identification assigned to the call information indication is different from the default value.

20. The system of claim 18, wherein, when the phone call between the TRS user and the call agent is terminated, the caption feedback server is configured to:
- receive a call clear indication from the TRS provider;
- delete the call information indication for the phone call between the TRS user and the call agent saved in the database;
- send the call clear indication to the call center; and
- disconnect between the TRS provider and the call center if the caption feedback server receives the call clear indication.

* * * * *